United States Patent Office 2,898,732
Patented Aug. 11, 1959

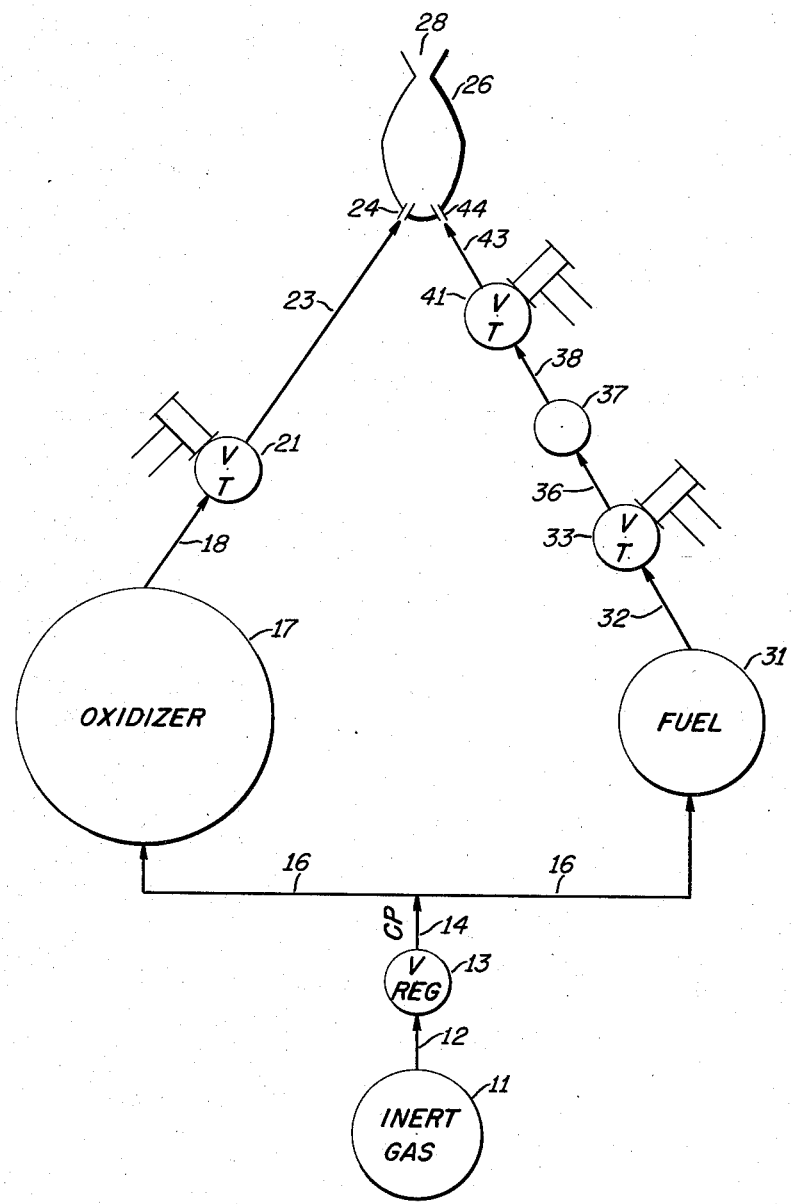

2,898,732
ROCKET PROPULSION METHOD USING PHOSPHORUS TRIAMIDE ROCKET FUEL

Don R. Carmody, Crete, and Alex Zletz, Park Forest, Ill., assignors to Standard Oil Company, Chicago, Ill., a corporation of Indiana Application January 29, 1952, Serial No. 268,843

14 Claims. (Cl. 60—35.4)

This invention relates to reaction propulsion. More particularly, it relates to novel fuels that are spontaneously combustible, when contacted with an oxidizer, for the generation of hot gases in a rocket motor.

Rocket propulsion is now being used to assist airplanes in take-off or to attain bursts of speed in excess of that attainable with the regular power plant. Also, rocket propulsion is being used in the military projectile field, wherein an explosive container is air-borne by means of an attached rocket motor; these projectiles may be launched from the earth's surface or from an airplane in flight.

Rockets use either a single self-contained fuel—monopropellant—which may be either a solid or a liquid; or a separate fuel and a separate oxidizer—bipropellant. The bipropellants are stored in separate tanks outside the rocket motor itself. The bipropellant rocket motor consists of a suitable combustion chamber provided with one or more pairs of injectors adapted to spray therein the fuel and the oxidizer, separately and simultaneously. The combustion of the fuel and the decomposition of the oxidizer creates a mass of hot, burning gases which are ejected at high velocity through a suitable nozzle; the reaction from this ejection provides the propulsive force.

The ignition reaction between the fuel and the oxidizer may be initiated by an electric spark, a hot wire, a hot surface or may be spontaneous. A spontaneous combustion or self-ignition is preferred because of the possibilities of electrical and mechanical failure of the spark and hot surface methods of ignition. A fuel which is self-igniting when contacted with an oxidizer is called a hypergolic material.

Many materials which are hypergolic at temperatures of about +75° F. lose this property when the temperature is lowered. The temperature at the earth's surface may vary from a high of about +120° F. to a low of −40° F., and in the polar and sub-polar regions, to as much as −70° F. The temperature of liquids stored in ordinary tanks exposed to the sun may reach as much as +150° F. The temperatures encountered by airplanes at high altitude are often as low as −70° F. Thus a rocket motor using a hypergolic fuel may have to be started into operation with the fuel and oxidizer at a temperature as low as, or possibly lower than, −70° F. In this specification, the term "atmospheric temperatures" includes the entire range from about +120° F. to about −70° F.

The walls of the combustion chamber become very hot from the heat of the burning gases generated by the reaction of the fuel and the oxidizer. This hot surface, and the mass of hot gases in the chamber, has a pronounced favorable effect on the self-ignition characteristics of the fuel and oxidizer. Many fuels which are non-hypergolic at the temperature existing in the fuel tank of the rocket unit are rapidly hypergolic in the extremely hot combustion chamber. For economy of operation, a fuel that is hypergolic at very low temperatures may be used to initiate the combustion in and to start the cold reaction motor; the use of this starter fuel may be continued until the hot gases generated have heated the combustion chamber to a high temperature; at this point the flow of the starter fuel can be stopped and a cheaper, although not as highly hypergolic or even a non-hypergolic fuel can be utilized for the continuous operation of the reaction motor.

An object of this invention is reaction propulsion by means of a hypergolic fuel and a nitric acid oxidizer. Another object is to provide a hypergolic mixed fuel for rocket propulsion, which mixed fuel contains appreciable amounts of essentially non-hypergolic hydrocarbons. Still another object is to provide a fuel for reaction propulsion which is hypergolic at atmospheric temperatures. A particular object is a reaction propulsion method that is not dependent on auxiliary ignition devices for initiating combustion at very low temperatures.

Very briefly, the novel hypergolic fuel of this invention consists of a N,N',N'' phosphorus triamide having the formula composition $(R_2N)_3P$ wherein: P represents the element phosphorus, N represents the element nitrogen and R represents the same or different hydrocarbon radicals selected from the group consisting of aliphatic radicals containing from 1 to 4 carbon atoms and cyclic radicals containing from 3 to 4 carbon atoms. A novel hypergolic mixed fuel is made by blending the above defined phosphorus triamide with an essentially non-hypergolic hydrocarbon in proportions that will be defined later in this specification.

The oxidizers of this invention are: The most commonly used material is white fuming nitric acid—abbreviated WFNA—which normally contains less than about 2 weight percent of water. More dilute solutions have been utilized by fortifying the acid with nitrogen tetroxide—$N_2O_4$. Red fuming nitric acid—RFNA—normally contains less than about 5% of water and between about 5 and 20% of $N_2O_4$. Sodium and potassium nitrites and sodium and potassium nitrates are often added to WFNA to depress the freezing point; usually an aqueous solution of the salt is used. Liquid nitrogen tetroxide is an excellent oxidizer when used above its freezing point. An excellent oxidizer for use at temperatures as low as about −65° F. is obtained by adding 10 to 30% of sulfuric acid or about 1 to 30% of oleum to strong nitric acid. Although nitric acid containing 30% of water can be used under some conditions, the particularly effective nitric acid oxidizers contain not more than about 10 weight percent of non-acidic material, such as, water or aqueous potassium nitrate solution. The preferred oxidizers are white fuming nitric acid, red fuming nitric acid, and nitric acid-oleum mixtures. The use of the general term "nitric acid oxidizer" in this specification and in the claims is intended to include all the favorable compositions described in this paragraph.

It has been discovered that certain N,N',N'' phosphorus triamides have hypergolic properties with nitric acid oxidizers at atmospheric temperatures. The commonly accepted structural formula for these phosphorus triamides is:

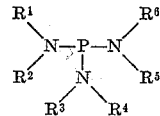

The numerically designated symbols R in the above structural formula represent the same or different hydrocarbon radicals selected from the group consisting of aliphatic radicals containing from 1 to 4 carbon atoms and naphthenic radicals containing from 3 to 4 carbon atoms. The term "aliphatic" is intended to include radicals that contain one or more unsaturated linkages as well as the alkyl radicals. The term "cyclic" is intended to include not only the cyclic radicals containing three or four carbon atoms in the ring, but also a three-member ring with a methyl substituent and also includes the presence of unsaturated linkages in the ring. The preferred phosphorus triamides are those wherein R represents radicals selected from the group consisting of methyl, ethyl, propyl and mixtures thereof.

Some examples of particular phosphorus triamides which are suitable for use as hypergolic rocket fuels are: N,N′,N″-tri-dimethyl phosphorus triamide; N,N′,N″-trimethyl ethyl phosphorus triamide; N,N′,N″-tri-diethyl phosphorus triamide; N,N′,N″-tri-diisopropyl phosphorus triamide; N,N′,N″-tri-isopropyl propyl phosphorus triamide; N,N′,N″-tri-propyl butyl phosphorus triamide; N,N′,N″-tri-diisobutyl phosphorus triamide; N,N′,N″-tri-diisopropenyl phosphorus triamide; N,N′,N″-tri-dibutenyl phosphorus triamide; N,N′,N″-tridicyclopropyl phosphorus triamide; N,N′,N″-tri-dimethylcyclopropyl phosphorus triamide.

The phosphorus triamides of this invention are in general heavy, mobile, high boiling liquids. They are fairly stable when exposed to elevated temperatures for moderate periods of time. They are susceptible to attack by atmospheric oxygen and are rapidly converted to non-hypergolic materials at elevated temperatures.

The phosphorus triamides can be made by the reaction of a secondary amine and phosphorus trichloride. For example, N,N′,N″-tri-dimethyl phosphorus triamide was prepared as follows: A three-necked round-bottom flask was connected to a gland stirrer, Dry Ice condenser, and a dropping funnel. An ether solution containing 10% of dimethylamine was placed in the flask while an ether solution containing 20% phosphorus trichloride was placed in the dropping funnel. The mol ratio of PCl₃ to amine was 1 to 6 with slight excess of amine. The PCl₃ solution was added to the amine solution with stirring and cooling of the flask by ice. When the addition was completed the solution was refluxed for one hour. The resulting mixture was filtered; the filtrate was stripped of ether and the residual liquid was vacuum distilled. The yield of product was approximately 80%. The purified N,N′,N″-tri-dimethyl phosphorus triamide distilled at 192–198° F. at 64 mm. pressure.

The phosphorus triamides of this invention are particularly suitable hypergolic fuels for rocket propulsion because of their low freezing points, high boiling points and comparatively small increase in viscosity with decrease in temperature. Not only do they have low freezing points, but also they have a great tendency to supercool, i.e., remain liquid at temperatures below the true freezing point. The presence of minor amounts of impurities, formed in the preparation of the phosphorus triamide, is beneficial in that the freezing point is depressed. There is no noticeable difference in hypergolic activity of the pure compound and of the compounds containing minor amounts of impurities. Those fuels which contain minor amounts of impurities from side reactions in the preparation of the phosphorus triamides are included within the scope of the invention.

Certain physical properties of the preferred phosphorus triamides are listed below:

| Alkyl Radical | Specific Gravity | B.P., °F. | F.P., °F. |
|---|---|---|---|
| Methyl | 0.91 | 192–198 (64 mm.) | −58 |
| Ethyl | 0.9 | 175–181 (1 mm.) | −75 |
| Propyl | 0.9 | 320–330 (15 mm.) | <−75 |

The freezing point of these compounds is not sharp and they do not solidify in a crystalline structure. However, they tend to form a glass at temperatures well below the apparent freezing point.

It has been found that hydrocarbons which are essentially non-hypergolic, even at temperatures above +120° F., can be mixed with the phosphorus triamides to obtain a fuel that is hypergolic with nitric acid oxidizers. The essentially non-hypergolic hydrocarbon should have a low freezing point, i.e., below −70° F., in order to obtain a low temperature hypergolic mixed fuel. The boiling point of the essentially non-hypergolic hydrocarbon has an effect on the ignition temperature of the mixed fuel; a non-hypergolic hydrocarbon with a maximum boiling point below about 600° F. is preferred.

The composition of the mixed hypergolic fuel is dependent primarily upon the particular nitric acid oxidizer being used and, below about 0° F., the composition of the mixed fuel, which is still hypergolic, is substantially independent of temperature. When using nitric acid containing less than about 5% of water as the oxidizer, such as, WFNA or RFNA, as much as 40 volumes of non-hypergolic hydrocarbon, boiling between 100° and 525° F., can be present in 100 volumes of the mixed fuel; this mixed fuel is hypergolic, with an extremely short ignition time, at atmospheric temperatures. Above about 0° F., the amount of non-hypergolic hydrocarbon tolerable in the mixed fuel increases with increase in temperature. At 75° F., the mixed fuel may contain about 60 volume percent of non-hypergolic hydrocarbon, when using nitric acid containing less than about 5% of water. The tolerance for non-hypergolic hydrocarbon in the mixed fuel is decreased with increase in non-acidic content of the nitric acid. For example, a mixture of only 30 volumes of a non-hypergolic hydrocarbon boiling between 100 and 525° F. and 70 volumes of N,N′,N″-tri-dimethyl phosphorus triamide is rapidly hypergolic at −78° F. when the oxidizer is either 90% fuming nitric acid or WFNA plus 4% of KNO₃ and 4% of water.

Certain hydrocarbons, such as, shale oil fractions, some olefins, etc. are highly reactive or even hypergolic to some extent with the oxidizer. A low-temperature hypergolic mixed fuel can be made with these hydrocarbons, which mixed fuel can contain less of the phosphorus triamides than a mixed fuel containing essentially non-hypergolic hydrocarbons. Such mixed fuels are within the scope of the invention.

The ignition characteristics of fuels were studied using a drop test method. This method utilizes a test tube, 1 in. x 4 in., containing 1 ml. of oxidizer. The fuel is added dropwise into the test tube by means of a syringe calibrated in 0.01 ml. markings. Usually 0.1 ml. of fuel is added per test; however, the feed usage may vary between 0.01 and 0.2 ml. per ml. of oxidizer. Low temperature tests were carried out by cooling the test tube and the oxidizer contained therein to the desired temperature by means of a Dry Ice-chloroform bath; a drying tube inserted into the top of the test tube excluded moisture. The fuel was cooled separately to the desired temperature. By supercooling, it was possible to carry out tests at temperatures below the freezing point of the fuel and of the oxidizer. The time elapsing between the addition of the fuel to the oxidizer and ignition thereof—the ignition delay—was determined visually as either: very short, short, ignition and no ignition. A very short delay corresponds to substantially instantaneous ignition.

In order to measure more accurately the amount of fuel added and also to approach more closely a reproducible degree of mixing, a capillary tube test was also used. A capillary tube of 2 mm. diameter or less, with a syringe attached at one end, is filled with a measured amount of fuel undergoing the test; an air space is left at the end of the tube. The capillary tube is inserted into the oxidizer in a beaker and the fuel is injected into the acid by depressing the syringe plunger. By this capillary tube method, amounts of fuel on the order of 0.0002 ml. can be added to the oxidizer.

The following tests illustrate the hypergolic activity of some of the phosphorus triamides and of other hypergolic fuels.

Test 1

This series of runs used WFNA, containing 2 weight percent of water, as the oxidizer. The minimum hypergolic temperature and visual ignition delay for each compound were determined when using 0.1 ml. or less of the compound per ml. of acid in the drop test. Temperatures below −49° F. were obtained by supercooling the acid.

| Compound | Minimum Hypergolic Temperature, °F. | Ignition Delay |
|---|---|---|
| N,N',N''-tri-dimethyl phosphorus tri-amide | Below −78 [1] | Very short. |
| N,N',N''-tri-diethyl phosphorus tri-amide | Below −70 [1] | Do. |
| Furfuryl alcohol | Below −73 | Do. |
| Monoethylaniline | +20 | Short. |
| Isobutyl mercaptan | −64 | Very short. |

[1] Supercooled fuel.

Test 2

This series of runs was made at +75° F. to determine the effect of the strength of the nitric acid on the hypergolic activity in the drop test. No difference was found between the performance of N,N',N''-tri-dimethyl phosphorus triamide and N,N',N''-tri-diethyl phosphorus triamide.

Acid conc. wt. percent: Ignition delay
96.8% WFNA _____ Very short
90% WFNA _____ Very short
70% _____ Short

Test 3

In this test WFNA plus 4% of potassium nitrate and 4% of water was contacted with N,N',N''-tri-dimethyl phosphorus triamide in the drop method. At a temperature of −78° F. the fuel ignited after a very short delay.

Test 4

This series of runs was made by the capillary tube method at +75° F. to determine the minimum volume of fuel required for ignition with 100 ml. of WFNA as the oxidizer.

Minimum volume, ml.
N,N',N''-tri-dimethyl phosphorus triamide ___ <0.0002
Furfuryl alcohol _____ 0.006
Isobutyl mercaptan _____ .009
Aniline _____ >.025

This invention is particularly advantageous when the fuel, oxidizer and combustion chamber are initially at atmospheric temperature as combustion begins without auxiliary ignition devices or without preheating of the combustion chamber. The nitric acid oxidizer and the fuel should be added to the combustion chamber separately and simultaneously so as to contact each other with considerable intermingling action. Usually the relative amounts of the two materials will be somewhat in excess of the theoretical oxygen balance ratio of oxidizer to fuel. When using the hypergolic fuels of this invention about 3.5 to 5.5 pounds of WFNA are injected per pound of the fuel. While it is possible to vary the ratio during operation, it is preferred to maintain a constant ratio.

By way of example, this invention is applied to the driving of an air-to-air missile. The figure shows a schematic layout of the combustion chamber and bipropellant feed system of a reaction motor, such as is used in a military rocket projectile. In the figure, vessel 11 contains a quantity of inert gas under high pressure; nitrogen or helium is a suitable gas. Helium is passed through line 12, through a regulatory valve 13 which passes the helium into line 14 at a constant pressure. From line 14, the helium is passed into line 16 which is connected to the vessels containing the fuel and the oxidizer. Vessel 17 contains the oxidizer; the pressure of the helium from line 16 forces the oxidizer through line 18, through solenoid actuated throttling valve 21, through line 23, and through injector 24 into combustion chamber 26. Combustion chamber 26 is provided with a nozzle throat opening 28. Vessel 31 contains the main supply of fuel. The helium pressure forces the fuel out of vessel 31 through line 32, through solenoid actuated valve 33, and through line 36 to vessel 37. Vessel 37 may be used to contain a special starter fuel or an additional amount of the main fuel. The pressure in line 36 forces the contents of vessel 37 through line 38, through solenoid actuated throttling valve 41, through line 43 and through injector 44 into combustion chamber 26. The injectors 24 and 44 are so arranged that the streams of liquid violently impinge and thoroughly intermingle and ignite. The combustion of the fuel and the oxidizer results in the generation of a large volume of very hot gases which pass out of the combustion chamber through throat 28; the reaction from this expulsion of gases drives the rocket.

For ordinary velocity operations, only one fuel is used, herein N,N',N''-tri-diethyl phosphorus triamide is used, and both vessels 31 and 37 will contain this fuel and valve 33 will be in the open position. The oxidizer is a mixture of WFNA and 8% of a 50% solution of $KNO_3$ in water. This oxidizer is used because it is liquid at the about −90° F. temperature which the oxidizer and fuel may attain while being carried at high altitude by an aircraft looking for a target. The missile is launched by activating the solenoids on valves 21 and 41. The oxidizer and the fuel are forced into the combustion chamber in the weight ratio of 4.5 to 1. Instantly combustion takes place and the missile hurtles toward the target.

For some operations, very high velocities are necessary, which velocities can be reached only by using a very high thrust fuel. An air-to-air missile usually has a relatively short combustion chamber and this fact limits the fuels that can be used for high thrust operation. Turpentine is an excellent high thrust fuel for this use. The turpentine is stored in vessel 31 and valve 33 is closed. About 4 lbs. of oxidizer—WFNA plus 8% of $KNO_3$ and water—are used per lb. of turpentine. The starter fuel is N,N',N''-tri-dimethyl phosphorus triamide and is stored in vessel 37. Only enough starter fuel to heat up the combustion chamber is needed; in this case 0.1 second of operation or less. The missile is launched by activating the solenoids in valves 21, 33 and 41. The turpentine forces the starter fuel into the combustion chamber where the oxidizer and starter fuel ignite and heat up the chamber. Without interruption, the turpentine follows into the heated chamber and burns to give the very high thrust reaction.

We claim:

1. A reaction propulsion method, which method comprises injecting separately and simultaneously into a combustion chamber a hypergolic fuel consisting essentially of an N,N',N''-phosphorous triamide having the generic formula, $(R_2N)_3P$ wherein P represents the element phosphorus, N represents the element nitrogen and R represents hydrocarbon radicals selected from the group consisting of aliphatic radicals containing from 1 to 4 carbon atoms and cyclic radicals containing from 3 to 4 carbon atoms, and a nitric acid oxidizer which contains not more than about 10 weight percent of non-acidic materials.

2. The method of claim 1 wherein said oxidizer is selected from the group consisting of white fuming nitric acid, red fuming nitric acid and nitric acid-oleum mixtures.

3. A rocket propulsion method, which method comprises bringing together in the combustion chamber of a rocket motor, a nitric acid oxidizer, containing not more than about 10 weight percent of non-acidic materials and a hypergolic fuel consisting essentially of an N,N',N''-tridialkyl phosphorus triamide wherein each alkyl radical contains from 1 to 4 carbon atoms.

4. A reaction propulsion method, which method comprises injecting separately and simultaneously into a combustion chamber a nitric acid oxidizer containing not more than about 5 weight percent of non-acidic materials and a hypergolic fuel consisting of an essentially non-hypergolic hydrocarbon and an N,N',N''-phosphorus triamide having the generic formula, $(R_2N)_3P$ wherein P represents the element phosphorus, N represents the element nitrogen and R represents hydrocarbon radicals elected from the group consisting of aliphatic radicals containing from 1 to 4 carbon atoms and cyclic radicals containing from 3 to 4 carbon atoms.

5. The method of claim 4 wherein said mixed fuel contains not more than about 30 volume percent of an essentially non-hypergolic hydrocarbon boiling below about 600° F.

6. A method of rocket propulsion, which method comprises bringing together into a combustion chamber of a rocket motor, a nitric acid oxidizer containing not more than about 5 weight percent of non-acidic materials and a mixed fuel consisting of not more than about 30 volume percent of an essentially non-hypergolic hydrocarbon and the remainder consisting essentially of N,N',N''-tri-dialkyl phosphorus triamide wherein each alkyl radical contains from 1 to 4 carbon atoms.

7. The method of claim 6 wherein said fuel contains an essentially non-hypergolic hydrocarbon boiling below about 600° F.

8. The method of claim 6 wherein said oxidizer is selected from the group consisting of white fuming nitric acid, red fuming nitric acid and nitric acid-oleum mixtures.

9. The method of claim 3 wherein said fuel is the methyl derivative.

10. The method of claim 3 wherein said fuel is the ethyl derivative.

11. The method of claim 3 wherein said fuel is the propyl derivative.

12. The method of claim 6 wherein said triamide is the methyl derivative.

13. The method of claim 6 wherein said triamide is the ethyl derivative.

14. The method of claim 6 wherein said triamide is the propyl derivative.

References Cited in the file of this patent

UNITED STATES PATENTS

| | | |
|---|---|---|
| 1,990,609 | Meis | Feb. 12, 1935 |
| 2,160,841 | Dreyfus | June 6, 1939 |
| 2,371,289 | Hamilton et al. | Mar. 13, 1945 |
| 2,573,471 | Malina et al. | Oct. 30, 1951 |

OTHER REFERENCES

Hackh's Chemical Dictionary, 3rd edition, page 559.